Aug. 16, 1960 E. WILDHABER 2,949,041

ANGULAR GEAR DRIVE

Filed April 24, 1957 2 Sheets-Sheet 1

INVENTOR:
Ernest Wildhaber

Aug. 16, 1960 E. WILDHABER 2,949,041

ANGULAR GEAR DRIVE

Filed April 24, 1957 2 Sheets-Sheet 2

INVENTOR:

Ernest Wildhaber

United States Patent Office 2,949,041 Patented Aug. 16, 1960

2,949,041

ANGULAR GEAR DRIVE

Ernest Wildhaber, 124 Summit Drive, Rochester 20, N.Y.

Filed Apr. 24, 1957, Ser. No. 654,791

18 Claims. (Cl. 74—416)

The present invention relates to angular gear drives for transmitting torque between a pair of members having unequal tooth numbers and whose axes intersect at an angle that differs from 180 degrees by from about ten degrees up. More specifically it refers to gear drives comprising an internal toothed member and an external toothed member meshing therewith.

One object of the present invention is to provide an angular gear drive where an external member meshes with an internal member in two diametrically opposite regions, so that the toothed loads of said regions add up to a turning moment, and one of said two members is readily centered on the other, and does not require a stationary bearing for rotatably mounting it. Related objects are to devise an angular gear drive of this character, where the shaft angle of the drive may vary somewhat from its mean value, and to devise a compact angular gear drive of high load capacity.

A still other object is to provide a complement to the angular toothed couplings disclosed in my application entitled "Toothed Couplings," filed May 7, 1956, Serial No. 582,961. This application discloses angular drives of a one to one ratio, whose shaft angle may vary somewhat from a mean value, and which mesh in two diametrically opposite regions. There a tooth of one member always remains in the same tooth space of the other member, while in the drives of the present invention a tooth moves out of a tooth space into another tooth space with every turn. This difference in action results in different properties, which to some extent are complementary.

Further objects are to devise an angular drive which can achieve large shaft angularities without being compelled to use very low tooth numbers, to reduce tooth sliding, and to achieve a drive with an increased number of teeth in simultaneous contact, and a drive with ample pitch line overlap although its teeth are straight. Pitch line overlap is ordinarily a property of helical or spiral teeth only.

A further aim is to devise an angular drive comprising an internal member with a single set of teeth and an external member with a double set of teeth adapted to mesh with said single set in diametrically opposite regions.

An aim attained in a modification is to provide an angular gear drive that requires a minimum of crowning and that gives practically no change in backlash when the shaft angle is changed a moderate amount from its mean value.

A further object is to devise a suitable seal for such drives, whose shaft angle varies slightly from a mean value, and a seal whose deformation in its repetitive cycles is kept at a minimum.

A still other object is to devise a drive through a propeller shaft from an engine shaft to a transmission shaft, where the propeller shaft includes an angle of at least ten degrees with each of the other two shafts, and where the engine is yieldingly mounted to tilt about an axis so directed that said angles are left practically unchanged by the yield of the engine about said axis. This to achieve conditions most favorable for the angular gear drives of the present invention, and broadly for drives containing toothed members.

Other objects will appear in the course of the specification and in the recital of the appended claims. These objects may be attained singly or in any combination.

Figure 1:
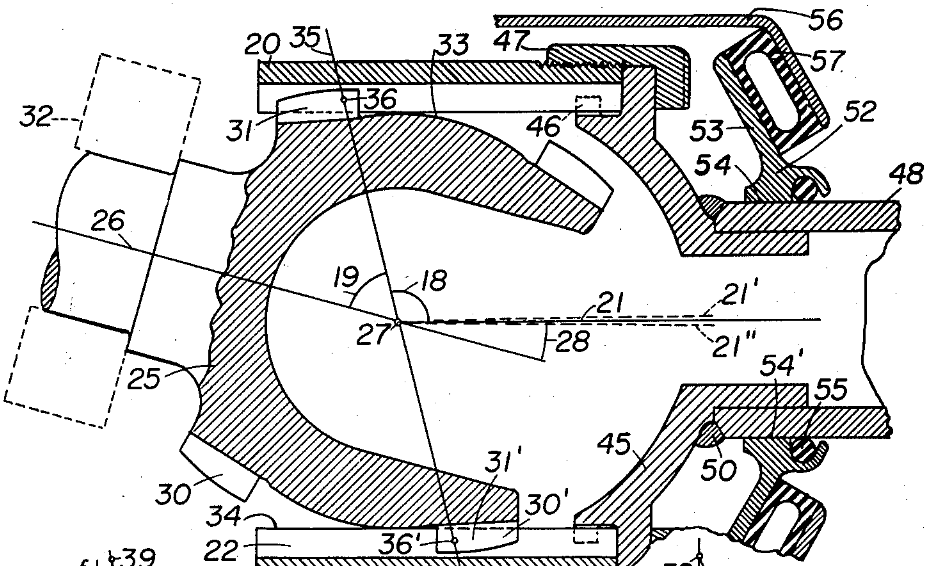
Fig. 1 is an axial section of an angular gear drive constructed according to the present invention.

In Figures 1 to 4 numeral 20 denotes an internal toothed member or gear with axis 21. It contains straight teeth 22 that extend parallel to its axis 21. The side profiles 23 (Fig. 2) of the teeth 22 are preferably involutes, having a base circle 24. Internal member 20 meshes with an externally toothed member 25 whose axis 26 intersects axis 21 at 27. The extended axis 26 includes an angle 28 with axis 21, an angle that may vary slightly in operation. Angle 28 will be referred to as the shaft angularity. It is 180 degrees minus the shaft angle. Axis 21 may move between positions 21′, 21″. The angles 21′—27—21 and 21″—27—21 are preferably smaller than ten percent of angularity 28.

External member 25 contains a double set of teeth 30, 30′ adapted to engage the single set of teeth 22 of the internal member 20 in two diametrically opposite regions 31, 31′. The driving loads are opposite in these opposite regions. And they are also equal, as the two members adjust themselves on each other so that they are equal. The opposite loads add up to a turning moment only. For this reason only one of the two members 20, 25 requires an adjacent bearing. Thus bearing 32 mounting external member 25 will do for both members.

If the shaft angularity 28 is fixed and does not vary, or is very nearly fixed, then the tooth contact in the two regions 31, 31′ is generally sufficient to center one member with respect to the other in all directions. This will be evident hereafter. To adapt the two members to more variation of shaft angularity the teeth are crowned. Preferably the teeth of the externally toothed member are crowned. Crowning localizes the tooth bearing and tends to impair the centering in a direction at right angles to the tooth normals at the points of contact. To insure good centering also in this direction I preferably provide a spherical surface 33 on the member 25, between the two sets of teeth 30, 30'. Spherical surface 33 has its center at 27, at the intersection of the axes 21 and 26, and is adapted to contact the cylindrical inside surface 34 of the teeth 22 all around its periphery. The sphere center is thereby maintained on axis 21 of the internally toothed member. The contact load to be carried by the sphere 34 is quite small.

A principal merit of the present invention thus is to do away with a bearing which other gear drives need. At the same time the load capacity is large, as there are two regions of contact. A compact and quiet design is achieved with simple means.

*The mesh*

The mesh for a full tooth bearing will now be described, that is without the crowning required for shaft angle variation. It provides a general basis for all shaft angularities, whether fixed or variable. In the latter case only part of this full mesh exists in any one running position.

The relative motion of the pair corresponds to that of bevel gears, as the axes 21, 26 intersect. There is an instantaneous axis 35 of relative motion, which passes through center 27. It divides the shaft angle (180 deg.—angle 28) into pitch angles 18, 19 of the two members 20, 25 respectively. Angle 18 is obtuse, that is larger than 90 degrees.

Any point of instantaneous axis 35 has distances from the axes 21, 26 proportional to the numbers of teeth of the respective members 20, 25. In the instance illustrated the tooth numbers are 30 and 27.

The lines of instantaneous contact of a considered tooth surface is the normal projection of the instantaneous axis 35 to said tooth surface.

With involute teeth 22 moreover each tooth normal remains normal to the involute tooth surfaces at all turning positions. A normal which intersects the instantaneous axis therefore represents an individual path of contact. All the paths of contact make up the surface of action. In each of the two regions 31, 31' the surface of action of involute teeth is the surface that contains all the normals which intersect the instantaneous axis and extends within the boundaries of the intermeshing teeth.

It is sufficient to consider one of the two contact regions, as they are symmetrical with respect to center 27.

Mean profile point 36 lies on the instantaneous axis 35 and is a point of contact. Its surface normal *b* (Fig. 2) is tangent to base circle 24 and constitutes an individual path of contact between the two members. To determine further paths of contact, points 37, 38, 39 are uniformly spaced on the instantaneous axis 35 (Fig. 3) and projected to Fig. 2. The normals *c*, *d*, *e*, *f* and *a* are then drawn tangent to base circle 24. They intersect the extended involute profile 23 which passes through point 36 at points *c'*, *d'*, *e'*, *f'* and *a'*. These points are projected to the respective normals *c*, *d*, *e*, *f* and *a* as they appear in Fig. 3, and determine points of the extended line of contact 40. Its portion that extends between the boundaries of the mating teeth is the actual line of instantaneous contact. It is shown as a full line. Other lines of contact 40', 40'' of other tooth surfaces are similarly determined. The portions within the boundaries of the contacting teeth are shown in dotted lines in Fig. 3, in projection.

The lines of instantaneous contact (40, 40', 40'') are inclined to the lengthwise direction of the teeth 22, 30. They sweep the tooth surfaces of the member 25 as the gears turn. The tooth contact moves lengthwise of the teeth as it does on spiral teeth or helical teeth. Here then we have a straight tooth which meshes like a spiral or helical tooth, with pitch-line overlap. This is a desirable feature, as it contributes to the quietness of operation. And it is achieved without incurring any axial thrust on member 20 and little of it on member 25.

The same kind of contact exists also in the diametrically opposite region 31'. As the contact normals *a*, *b*, *c*, *d*, *e*, *f* of each contact region occupy a substantial part of the circumference of gear 20, this tooth contact is capable of centering the two members 20, 25 one on the other, in all radial directions. This applies when little or no ease-off is used, so that the tooth bearing is not much localized.

Figure 3:
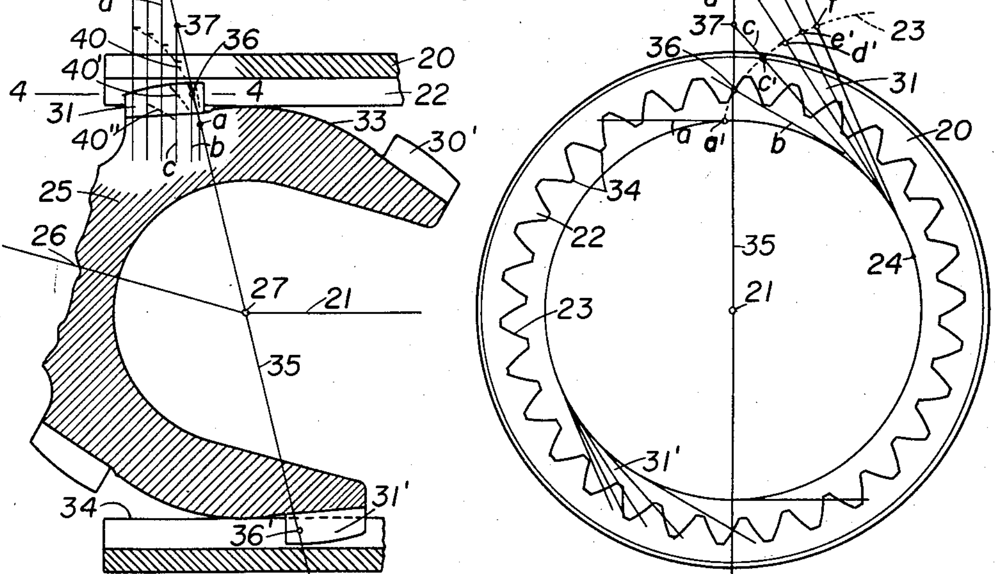
Fig. 3 is a fragmentary axial section like Fig. 1, illustrating the mesh and the lines of contact.
Figure 4:
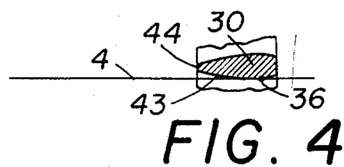
Fig. 4 is a fragmentary section through a tooth of the external member, the section being taken along a conical surface coaxial with the external member and containing straight-line element 4 (Fig. 3), and said conical surface being developed into a plane.

Fig. 4 shows a tooth 30 in a conical section containing cone element 4 (Fig. 3) and having an axis 26. The cone element 4 passes through mean profile point 36 and is tangent to the longitudinal tooth profile 43. Profile 43 is convex and increasingly sloped towards the outer end 44 of tooth 30. This lens shape of the tooth enables us to use more teeth than is feasible on toothed couplings at the same ample shaft angularity and a one to one ratio. In other words the present drive is not confined to low tooth numbers, even at substantial shaft angularities. Larger tooth numbers, with more pitch-line overlap, are feasible. Indeed the restriction is here opposite. Very low tooth numbers cannot be used with small shaft angularities, because of possible interference of the mating teeth with each other. This restriction decreases with increasing shaft angularities.

Tooth sliding is proportional to the distance of the considered contact point from the instantaneous axis (35). Points 36, 36' lie on the instantaneous axis, so that there is no relative sliding there. The surface of action of each region 31, 31' intersects the instantaneous axis and extends on both sides of it. For this reason sliding is moderate at all points of contact.

*General design and operation*

Internally toothed member 20 is rigidly connected with a flange member 45, by external teeth 46 formed thereon and by a nut 47 threading onto member 20. The teeth 46 engage and match the internal teeth 22 of member 20 and provide a positive connection. The flange member 45 is rigidly secured to a tubular propeller shaft 48, as by welding at 50.

In operation, the rotating member 25 meshes with member 20 in the two diametrically opposite regions 31, 31' to transmit torque between them and to support it.

Ease-off or crowning is provided depending on the variation in shaft angularity in operation. The larger the variation, the more the teeth 42 should be eased off. While ease-off reduces the tooth-bearing area in any one running position, it is made to keep the tooth bearing within the tooth boundaries in all running positions, without concentration at the tooth ends. The shown drive transmits uniform motion even when the ease-off is substantial.

But is should be understood that the tooth surface stresses increase with decreasing tooth-bearing area, and that the tooth-bearing area should be kept as large as compatible with the variation of the shaft angularity.

An important feature of such drives is the seal which retains the lubricant. Flexible rubber-like boots have been used successfully where the shaft angularity is generally small. However at the much larger and nearly constant angles (28) here shown the large flexing of such boots at every turn is detrimental at high speed.

The difficulties are overcome with my new seal that should be part of such drives. The seal assembly 52 (Fig. 1) comprises a seal holder 53 bearing on a surface of revolution 54 that is provided on a portion rigid with internal member 20. Surface 54 is the cylindrical outside surface of the tubular propeller shaft 48. It may be accurately finished or ground at this end, or if desired, surface 54 may be provided on a sleeve secured to the propeller shaft. The seal proper is indicated as an oil ring 55, but may be of any suitable known construction. The main feature is that the seal holder is supported on one of the two members of the drive. It follows this one member and partakes in the moderate variation of shaft angularity.

The holder 53 may be made of metal or non-metal, as may be desired. It is relatively rigid. Its contact surface 54' may be eased off.

To permit the holder 53 to move bodily with member 20, the holder is mounted in rubber-like portions 57 on a stationary sleeve part 56. If the angular variation (21', 21'') is quite small, I may use a solid rubber ring. The tube-like rubber part 57 permits larger variations than a solid ring without causing undue pressures. Rubber-part 57 is bonded on opposite sides to the holder 53 and to stationary part 56. Any suitable known kind of bond may be used that produces good adhesion. Also what I have referred to as rubber may be any suitable flexible material.

The seal 55 proper is not under any more stress than conventional rotation seals. And the rubber part 57 does not flex at every turn. It only has to allow for the relatively small variation of the shaft angularity, which does not repeat with each turn and occurs only occasionally. Here then is a suitable seal which is not subjected to much punishment even at large shaft angularities, so that it will stand up reliably. This effect is achieved by splitting up the seal function into a seal proper (55) and into a rubber part (57) that has to accommodate only the occasional variation of shaft angularity.

*Further embodiments*

In the drive just described, as in most drives, a change of shaft angularity changes the backlash in the teeth and requires ease-off. A very special case will now be described in which the backlash is left practically unchanged by a moderate change of shaft angularity, and where practically no ease-off is required to allow for such change.

The internally toothed member 60 with axis 61 has straight teeth 62 parallel to axis 61. The teeth 62 preferably have chamfered ends 62'. The externally toothed member 65 has a double set of teeth 63 meshing with the single set of teeth 62. Its axis 66 intersects axis 61 at 67.

The tooth ratio and means shaft angularity are here so related, that the instantaneous axis 64 of relative motion forms a right angle 68 with axis 61 of the member 60.

Figure 2:
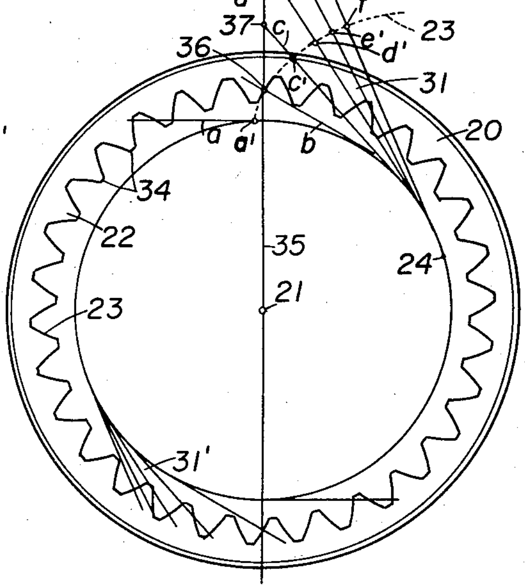
Fig. 2 is an end view of the internal member of this drive, looking from right to left in Fig. 1, showing also the lines of action with the mating external member, and a construtcion for determining the lines of contact.

When the procedure described with Figures 2 and 3 is applied, it is found that the mesh between mating teeth occurs wholly in the plane 64' that contains the instantaneous axis 64 and is perpendicular to the axis 61 of member 60. This plane can be considered the kinematic pitch plane of a crown gear represented by member 60.

When the shaft angularity is slightly altered, so that axis 66 assumes a position 66' or 66'', the member 65 is displaced at right angles to its contact normals, whereby the backlash tends to remain unchanged. Also the tooth shape of member 65, determined for the new position, is found to be practically the same as for original position. In principle no ease-off is here required to permit a moderate angular change. But some ease-off is preferably used.

Figure 5:
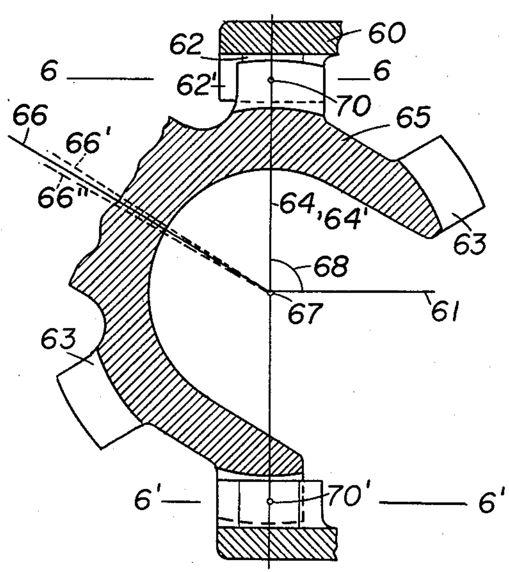
Fig. 5 is a fragmentary axial section of an angular gear drive constructed according to a modification.
Figure 6:
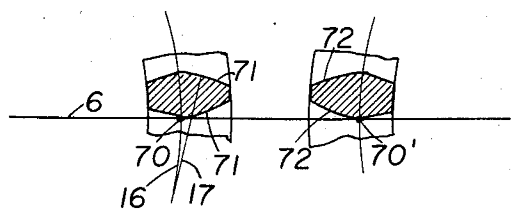
Fig. 6 is a pair of developed conical sections each similar to Fig. 4, taken along lines 6—6 and 6′—6′ of Fig. 5, and showing a pair of aligned teeth of the external member.

Fig. 6 is a conical section with axis 66, taken along line 6—6 of Fig. 5 and developed into a plane, and a similar conical section taken along line 6'—6' on a tooth of the opposite set. The cone elements 6—6 and 6'—6' are parallel to axis 61 and pass through mean points 70, 70' respectively. The longitudinal working profiles 71, 72 of the teeth 63 are confined to the region between the thickest parts of the teeth of the two sets, between points 70, 70'. The profiles in these conical sections are very similar to those of a spherical section tangent thereto and centered at 67. The profiles of the spherical section are exact spherical involutes, such as may be described on member 65 by a point (70) of plane 64', when the latter is unrolled from a conical pitch surface that contacts plane 64' along the instantaneous axis 64 and is coaxial with and rigid with member 65. The tooth normals 17 are tangent to this pitch surface 16 (Fig. 6). The profiles of all spherical sections with center 67 are spherical involutes.

The depthwise tooth profiles of the internal member 60 in plane 64' may be involutes similar to the involutes 23 of Fig. 2. Or they may be of any other desired shape, including straight lines. Involutes facilitate the production of the external member, as will be further described.

The advantage in adjustment is caused by the mesh lying wholly in plane 64'. This has also a less desirable effect. It confines the tooth action to a single plane on gear 60, or to a narrow region following said plane. For spreading the contact on gear 60 it is relied on the occasional axial displacements of this gear and on the slight changes in shaft angularity.

Figure 7:
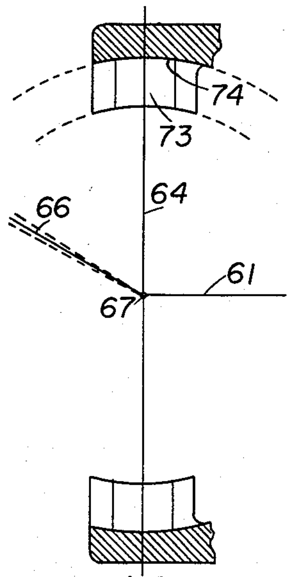
Fig. 7 is an axial section of the internal member of a further modification, that has the same external member as the drive of Fig. 5.

On the other hand, the contact may be improved when the member 60 is maintained axially fixed in any suitable known way. Then, instead of using longitudinally straight tooth sides, concave tooth sides 73 (Fig. 7) and concave tooth bottoms 74 may be used on the internally toothed member to provide a more intimate tooth contact. The concavity may be selected to nearly match the convex mating tooth surfaces in the region where they are least curved.

Broadly the teeth of the internally toothed member of my angular gear drives may extend along a zone of a surface of revolution. The instantaneous axis intersects this tooth zone at an angle preferably larger than 45 degrees.

*Production*

The production of the internally toothed member is conventional. It may be for instance by broaching. In principle the teeth of the externally toothed member could be finished by generation with a reciprocatory tool that describes the teeth of the internally toothed member, first one side of the teeth and then the other side. As the tool reciprocates, the tool and the work piece turn very slowly on their respective axes at the required ratio, as if the two members would mesh.

This produces an externally toothed member adapted to run with the internally toothed member at a fixed shaft angularity. To attain a range of shaft angularities ease-off would have to be applied, either by additional motions in cutting, or in a shaving operation.

Preferably however I hob the teeth of the externally toothed member with either cylindrical hobs or the taper hobs described in my above-named application. The hobbing process is similar to the one described therein. The tooth shape is the result of a controlled depthwise feed between the hob and the work piece. It is possible to control the shape of one side of the teeth at a time with depth feed alone. To attain also any desired form of tooth bottom the timing between the hob and work piece may be varied in addition. By adding a timing change to the depth feed it becomes furthermore possible to produce both sides of the teeth simultaneously and exactly.

Shaving the externally toothed member with an internal or external shaving tool is also feasible.

*General disposition*

Figure 8:
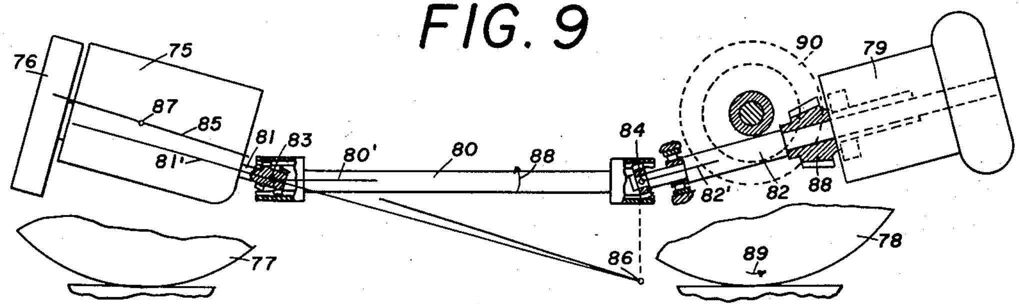
Fig. 8 is a diagram of an automotive drive from an engine to the rear axle, employing an angular gear drive of the present invention in such a way as to keep the operational variations of the shaft angles at a minimum.

An important application to automotive vehicles is illustrated in Fig. 8 diagrammatically. An engine 75 with flywheel 76 is yieldingly mounted in front of the vehicle indicated by its front wheels and rear wheels 77, 78 respectively. The transmission 79 is in the rear. A propeller shaft 80 connects the engine 75 with the transmission 79. The propeller shaft is kept low. This position is attained by tilting the engine and the transmission, so that the axis 80' of the propeller shaft intersects the axes 81', 82' of the engine shaft 81 and of the driving shaft 82 of transmission 79. The transmission is mounted on the vehicle frame, and the driven rear wheels (78) are independently sprung. At the intersection point 83 of the axes 81′ and 80′, and at the intersection point 84 of the axes 80′, 82′ means are used adapted to transmit torque between the two adjacent angularly disposed shafts. This general arrangement, as described so far, is not novel with the present invention.

In accordance with the present invention the said means used at one of the points 83, 84, or at both of them, are angular gear drives constructed according to the present invention. More broadly, they are angular drives containing an internally toothed member meshing with an externally toothed member. Unlike the more complex constant-velocity universal joints, such drives generally require ease-off for accommodating a range of shaft angularities. That is, they have to run with restricted or localized tooth bearings. Also their backlash changes with the change of shaft angularity.

Obviously it is desirable to use a tooth bearing only moderately localized and a backlash change as small as possible. In other words, the variation of shaft angularity in operation should be kept small to make these simple drives truly attractive. This aim is accomplished with the disposition now to be described.

Figure 9:
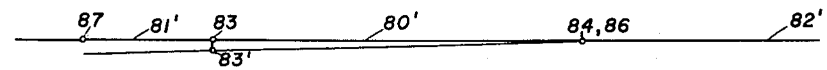
Fig. 9 is a diagrammatic plan view corresponding to Fig. 8 and looking from the top down.

The engine 75 is mounted on the vehicle frame in rubber-like material to yield and tilt about an axis 85 which intersects the extended axis 81′ of the engine shaft at a point 86 vertically below point 84. The effect of this arrangement is best seen in the diagrammatic plan view Fig. 9. At an assumed angular displacement about axis 85 point 83 moves to a position 83′, and axis 81′ moves into a position 83′—86, which in projection coincides with the new position 83′—84 of the axis 80′ of the propeller shaft. With the yielding angle about axis 85 confined to the moderate amounts that occur in practice, point 83 moves horizontally, or approximately so. The new position of the axes 81′, 80′ is very nearly the same as if they were turned about a vertical axis 84—86. Their angle remains unchanged, or practically unchanged. This is also true for the angle at point 84. Inasmuch as point 83 moves horizontally, it moves in the same direction as if turned about the axis 82′ of the transmission shaft 82. The angle between the axes 80′ and 82′ also tends to stay constant.

The described arrangement thus enables us to use simple angular drives without penalty.

Axis 85 preferably passes through the center of gravity 87 of the engine, as is usual.

Another feature is the shown arrangement of the hypoid drive pinion 88 coaxial with the drive-shaft 82 of the transmission 79, and rotatably mounted on said drive shaft. A still other feature lies in the hand and disposition of the hypoid drive. On hypoid drives the hand is tied up with the position. Also the two sides of the teeth are dissimilar, the longitudinally convex sides of the gear teeth having a lower pressure angle than the longitudinally concave side, for kinematic reasons.

The conventional engine turns clockwise when viewed from the front. This may be a tradition taken over from the hand-cranking days. Such an engine will turn the propeller shaft 80 in a direction opposite to arrow 88. The hypoid ring gear (90) should then be placed behind shaft 82, so that in Fig. 8 we would be looking at the teeth of the gear. This to achieve forward motion along arrow 89 with the hypoid pinion rotating in the same direction as the transmission shaft 82. This position is known to call for a right-hand hypoid gear and left-hand hypoid pinion. The forward drive would then be through the longitudinally concave side of the gear teeth, the side of high pressure angle.

It is considered preferable to drive forward through the longitudinally convex side of the gear teeth, as is done universally at present. This side of lower pressure angle results in somewhat lower tooth pressures at a given torque, and in more favorable bearing pressures.

To achieve forward drive through this side I place the hypoid gear 90 in front of shaft 82, so that in Fig. 2 we look at the rear of the hypoid gear. This changes the hand of the hypoid pair, so that the gear is now left hand and the pinion right hand, and the forward drive is on the longitudinally convex side of the gear teeth. This more favorable disposition calls for an engine that runs counter-clockwise, when viewed from the front, so that shaft 80 turns in the direction of arrow 88.

The transmission 79 may be of any suitable known kind, automatic or hand-operated.

While the invention has been described in connection with several different embodiments thereof, it will be understood that it is capable of further modification; and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

I claim:

1. An angular gear drive comprising an internally toothed gear member and an externally toothed gear member having different numbers of teeth and axes intersecting at an angularity of at least ten degrees, said members being adapted to mesh with each other in two diametrically opposite regions, so that the tooth loads at said regions add up to a turning moment.

2. An angular gear drive comprising an internally toothed gear member and an externally toothed gear member having different numbers of teeth and axes intersecting at an angularity of at least ten degrees, said members being adapted to mesh with each other in two diametrically opposite regions, the teeth of said internally toothed member extending along a zone of a surface of revolution, which zone is intersected by the instantaneous axis of relative motion of said two members.

3. An angular gear drive comprising an internally toothed member having a single set of teeth and an externally toothed member having a double set of teeth adapted to mesh with said single set in two diametrically opposite regions.

4. An angular drive for transmitting torque between two members whose axes intersect at an angle which may vary in operation by less than ten percent of its mean value, in either direction, comprising said two members, bearing means for rotatably mounting one of said members on relatively stationary portions, a part rigid with said portions, a seal, a seal holder adapted to bear slidingly on a surface of revolution provided on the other of said two members, to maintain said seal in contact with said other member, and yielding means connecting said holder with said part.

5. An angular drive according to claim 4, wherein said surface of revolution is a cylindrical surface coaxial with a shaft that transmits the torque of said other member.

6. An angular drive according to claim 4, wherein said seal holder is connected with said part through a pair of ring-shaped connections of rubber-like material.

7. An angular drive according to claim 4, wherein said holder is connected with said stationary part by a ring of rubber-like material, said ring being bonded on opposite sides to said holder and to said part respectively.

8. An angular drive according to claim 4, wherein said holder is connected with said stationary part by means of a ring-shaped tube of rubber-like material, said tube having an approximately rectangular cross-sectional profile on the outside and being bonded on opposite sides to said holder and to said part respectively.

9. In an automotive vehicle, in combination, an engine yieldingly mounted in front of said vehicle, a transmission secured to the vehicle body in the rear, a propeller shaft for connecting the engine shaft and the driving shaft of said transmission, the axis of said propeller shaft intersecting the axes of each of the two other named shafts and including an angle therewith, means for operatively connecting the engine shaft and propeller shaft, means for operatively connecting said propeller shaft and transmission shaft, at least one of said two means comprising an internally toothed member and an externally toothed member in mesh with each other and rigid with the two thereby connected shafts respectively, said engine being mounted to tilt yieldingly about an axis that passes approximately through its center of gravity and that is inclined to and intersects the extended axis of the engine shaft at a point closer to the second-named means than to the first-named means.

10. In an automotive vehicle, the combination according to claim 9, wherein said engine is mounted on the vehicle to tilt yieldingly about an axis that intersects the extended axis of the engine shaft vertically below the point of intersection of the axes of the propeller shaft and of the transmission shaft.

11. An angular gear drive comprising an internally toothed gear member and an externally toothed gear member having different numbers of teeth and axes intersecting at an angularity of at least ten degrees, said members being adapted to mesh with each other in two diametrically opposite regions which are spaced apart axially of said externally toothed member, so that the tooth loads at said regions add up to a turning moment, said externally toothed member containing a spherical portion centered on its axis and adapted to contact portions of the internally toothed member for centering one member on the other.

12. An angular gear drive comprising an internally toothed gear member and an externally toothed gear member having different numbers of teeth and axes intersecting at an angularity of at least ten degrees, said members being adapted to mesh with each other in two diametrically opposite regions which are spaced apart axially of said externally toothed member, the teeth of said internally toothed member extending along a zone of a surface of revolution, which zone is intersected by the instantaneous axis of relative motion of said two members, said instantaneous axis intersecting said tooth zone at an angle larger than one half of a right angle.

13. An angular gear drive comprising an internally toothed gear member and an externally toothed gear member having different numbers of teeth and having axes intersecting at an angularity of at least ten degrees, said members being adapted to mesh with each other in two diametrically opposite regions which are spaced apart axially of said externally toothed member, the teeth of said internally toothed member extending along a zone of a surface of revolution, which zone is intersected by the instantaneous axis of relative motion of said two members, said instantaneous axis intersecting said tooth zone at an angle larger than one half of a right angle and forming an angle of at least ninety degrees with the axis of said internally toothed member, said angle being the kinematic pitch angle of the last-named member.

14. An angular gear drive comprising an internally toothed member having a single set of teeth and an externally toothed member having a double set of teeth adapted to mesh with said single set in two diametrically opposite regions, one set of said double set meshing in one region and the other set of said double set meshing in the diametrically opposite region, the teeth of said internally toothed member being straight and parallel to its axis, and each of the teeth of said double set having a thickness changing along the length of the tooth and being smallest at the end of the tooth which has the largest axial distance from the longitudinal center of said externally toothed member.

15. An angular gear drive comprising an internally toothed gear member and an externally toothed gear member having different numbers of teeth and having axes intersecting at an angularity of at least ten degrees, said members being adapted to mesh with each other in two diametrically opposite regions intersected at right angles by the instantaneous axis of relative motion of said two members, said internally toothed member having a single set of teeth, and said externally toothed member having two axially-spaced sets of teeth adapted to engage said single set of teeth of said internally toothed member, one set of said two axially-spaced sets meshing with said single set of teeth in one region, and the other set of said two axially-spaced sets meshing with said single set of teeth in a diametrically opposite region.

16. An angular gear drive comprising an internally toothed gear member and an externally toothed gear member having different numbers of teeth and having axes intersecting at an angularity of at least ten degrees, said members being adapted to mesh with each other in two diametrically opposite regions intersected by the instantaneous axis of relative motion of said two members, said internally toothed member having straight teeth, said externally toothed member having two axially-spaced sets of teeth of varying thickness disposed to contact said straight teeth of said internally toothed member, the working portions of said double set of teeth lying wholly between the zones of largest thickness of said double set of teeth.

17. An angular gear drive comprising an internally toothed gear member having a single set of teeth and an externally toothed gear member having a double set of teeth disposed to mesh with said single set in two diametrically opposite regions, one set of said double set of teeth meshing in one region and the other set of said double set of teeth meshing in the diametrically opposite region, the two sets of teeth of said externally toothed member being separated axially of said externally toothed member by a gap at least as wide as the face width of one of said two sets, the two regions of mesh being spaced apart axially a larger distance on the externally toothed member than on the internally toothed member.

18. An angular gear drive comprising an internally toothed gear member having straight teeth and an externally toothed gear member having two sets of teeth adapted to mesh with said straight teeth in two diametrically opposite regions, one set of teeth of said externally toothed member meshing with the teeth of said internally toothed member in one region, and the other set of teeth of said externally toothed member meshing with the teeth of said internally toothed member in the diametrically opposite region, said two sets of teeth being separated axially of said externally toothed member by a gap at least as wide as the face width of one of said two sets, the peripheral surface of said gap comprising a convex spherical surface centered on the axis of said externally toothed member in the mid-plane of the gap, said spherical surface being disposed to contact the cylindrical surface formed by the tips of the teeth of said internally toothed member.

References Cited in the file of this patent

UNITED STATES PATENTS

| | | |
|---|---|---|
| 1,871,883 | Geyer | Aug. 16, 1932 |
| 2,687,025 | Wildhaber | Aug. 24, 1954 |
| 2,738,023 | Barenyi | Mar. 13, 1956 |

FOREIGN PATENTS

| | | |
|---|---|---|
| 564,395 | Great Britain | Sept. 26, 1944 |